(12) United States Patent
Nozawa et al.

(10) Patent No.: US 10,520,958 B2
(45) Date of Patent: Dec. 31, 2019

(54) PRESSURE CONTROL DEVICE

(71) Applicant: Fujikin Incorporated, Osaka-shi (JP)

(72) Inventors: Takahiro Nozawa, Osaka (JP); Takeshi Nakamura, Osaka (JP)

(73) Assignee: Fujikin Incorporated, Osaka (JP)

( * ) Notice: Subject to any disclaimer, the term of this patent is extended or adjusted under 35 U.S.C. 154(b) by 144 days.

(21) Appl. No.: 15/686,981

(22) Filed: Aug. 25, 2017

(65) Prior Publication Data

US 2017/0351274 A1    Dec. 7, 2017

Related U.S. Application Data

(63) Continuation of application No. PCT/JP2016/050253, filed on Jan. 6, 2016.

(30) Foreign Application Priority Data

Feb. 26, 2015    (JP) .................................. 2015-036113

(51) Int. Cl.
  *G05D 16/20*    (2006.01)
  *G05B 11/36*    (2006.01)
  *G05B 11/01*    (2006.01)

(52) U.S. Cl.
  CPC ............ *G05D 16/20* (2013.01); *G05B 11/011* (2013.01); *G05B 11/36* (2013.01); *G05D 16/2013* (2013.01)

(58) Field of Classification Search
  CPC .. G05D 16/20; G05D 16/2013; G05B 11/011; G05B 11/36
  See application file for complete search history.

(56) References Cited

U.S. PATENT DOCUMENTS 3,812,456 A * 5/1974 Lane ...................... F42B 22/04
                                                           181/402
4,559,784 A * 12/1985 Jenny ..................... F02B 33/44
                                                           60/606

(Continued)

FOREIGN PATENT DOCUMENTS

JP        61065127 A  *  4/1986  .......... G01L 19/083
JP        03291706 A  *  12/1991

(Continued)

OTHER PUBLICATIONS

"International Application No. PCT/JP2016/050253, International Search report dated Feb. 9, 2016", (Feb. 9, 2016), 6 pgs.

*Primary Examiner* — Thomas C Lee
*Assistant Examiner* — Michael Tang
(74) *Attorney, Agent, or Firm* — Schwegman Lundberg & Woessner, P.A.

(57) ABSTRACT

A pressure control device maintains a pressure within a target of pressure control at a set pressure. The pressure control device includes a correction circuit that corrects a pressure signal, which represents the pressure within the target of pressure control that is detected by a pressure sensor, such that the pressure signal approaches a set pressure signal representing the set pressure; a comparison circuit that compares the corrected pressure signal with the set pressure signal; and a valve drive circuit that controls an opening and closing of a flow control valve based on a comparison result from the comparison circuit. The correction circuit is a filter circuit. The frequency characteristic of the filter circuit has a peak at a prescribed frequency, and corrects the pressure signal so as to raise a component of the prescribed frequency of the pressure signal.

3 Claims, 3 Drawing Sheets

(56) References Cited

U.S. PATENT DOCUMENTS

| | | | |
|---|---|---|---|
| 7,010,136 B1* | 3/2006 | Roberts | H04R 25/502 381/317 |
| 2004/0103880 A1* | 6/2004 | Hirayama | F02D 11/107 123/350 |
| 2006/0190099 A1* | 8/2006 | Nangoy | G05B 13/021 700/28 |
| 2008/0041074 A1* | 2/2008 | Tarutani | H05G 2/003 62/132 |
| 2010/0266136 A1* | 10/2010 | Kelloniemi | G10K 11/178 381/71.6 |

FOREIGN PATENT DOCUMENTS

| | | |
|---|---|---|
| JP | H03291706 | 12/1991 |
| JP | H11333277 | 12/1999 |
| JP | 2006528765 | 12/2006 |
| WO | WO-2016136282 | 9/2016 |

\* cited by examiner

PRESSURE CONTROL DEVICE

CROSS REFERENCE TO RELATED APPLICATION

This application is a continuation application of International Application No. PCT/JP2016/050253, filed Jan. 6, 2016, which claims priority to Japanese Patent Application No. 2015-36113, filed Feb. 26, 2015. The contents of these applications are incorporated herein by reference in their entirety.

FIELD OF THE INVENTION

The present invention relates to a pressure control device for use in semiconductor manufacturing devices and the like.

BACKGROUND OF THE INVENTION

Pressure control devices which maintains a pressure within a chamber constant have conventionally been proposed in Japanese Patent Application Publication No. H03-291706. The pressure control device disclosed in Japanese Patent Application Publication No. H03-291706 detects the pressure within the chamber using a pressure sensor and controls the pressure within the chamber to a constant level by turning on and off the supply of gas based on the detected pressure and a set pressure.

SUMMARY OF THE INVENTION

Incidentally, depending on the circumstances of the facilities, in some cases the volume of the chamber is large with respect to the controlled flow of a gas, or the pipe between the pressure control device and the chamber is long. In such cases, when the pressure control disclosed in PTL 1 is performed, a delay time occurs in the time from the flow of the gas by opening the flow control valve device until the pressure within the chamber increase or from when the flow control valve device is closed until when the pressure drops. Consequently, the pressure within the chamber fluctuates and cannot be maintained constant.

Therefore, an object of the present invention is to provide a pressure control device that is capable of maintaining a constant pressure within a chamber even if a volume of the chamber with respect to the controlled flow of a gas is large or when a pipe between a flow control valve device and the chamber is long.

In order to attain the above object, a pressure control device which maintains a pressure within a target of pressure control at a set pressure, according to one embodiment of the present invention includes: a correction circuit that corrects a pressure signal, which represents the pressure within the target of pressure control that is detected by a pressure sensor, such that the pressure signal approaches a set pressure signal representing the set pressure; a comparison circuit that compares the corrected pressure signal with the set pressure signal; and a valve drive circuit that controls an opening and closing of a flow control valve based on a comparison result from the comparison circuit. The correction circuit is a filter circuit. The frequency characteristic of the filter circuit has a peak at a prescribed frequency, and corrects the pressure signal so as to raise a component of the prescribed frequency of the pressure signal.

DESCRIPTION OF THE EMBODIMENT

A pressure control device according to an embodiment of the present invention is now described with reference to the drawings.

Figure 1:
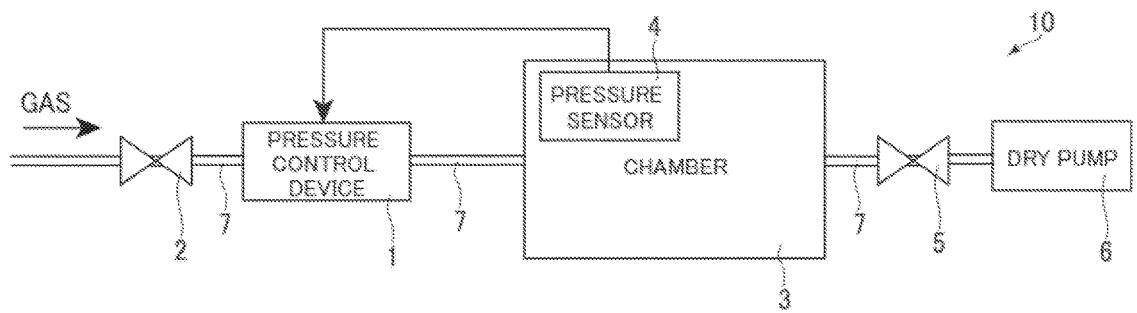
FIG. 1 shows a configuration diagram of a pressure control system having a pressure control device according to an embodiment of the present invention.

FIG. 1 shows a configuration diagram of a pressure control system 10 having a pressure control device 1.

The pressure control system 10 has the pressure control device 1, an opening/closing valve device 2, a chamber 3, which is a target of pressure control, a pressure sensor 4, a variable valve device 5, a dry pump 6, and a pipe 7.

A gas supply source, not shown, is connected to the pressure control device 1 by the pipe 7. The opening/closing valve device 2 is provided on the upstream side of the pressure control device 1.

The chamber 3 is provided with the pressure sensor 4 for detecting pressure and is connected to the pressure control device 1 by the pipe 7. Pressure detected by the pressure sensor 4 is sent to the pressure control device 1 as a pressure signal. The chamber 3 and the dry pump 6 are connected to each other by the pipe 7, and the variable valve device 5 is provided between the chamber 3 and the dry pump 6.

Next, the configuration of the pressure control device 1 is described with reference to FIG. 2.

Figure 2:
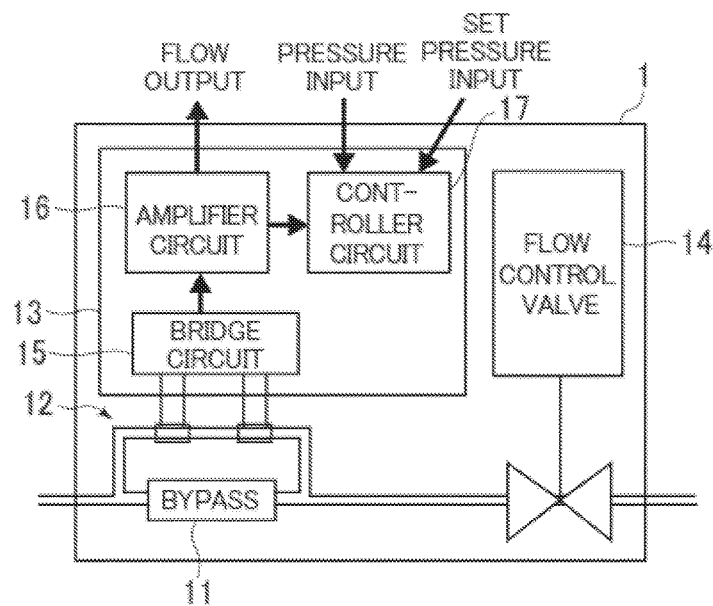
FIG. 2 shows a configuration diagram of the pressure control device.

FIG. 2 shows a configuration diagram of the pressure control device 1.

As shown in FIG. 2, the pressure control device 1 has a bypass 11, a flow sensor 12, a controller 13, and a flow control valve device 14, which is a solenoid valve device. The controller 13 has a bridge circuit 15, an amplifier circuit 16, and a control circuit 17.

Gas that flows into the pressure control device 1 is separated into the bypass 11 and the flow sensor 12 to a prescribed flow ratio. Two coils in the flow sensor 12 compose a part of the bridge circuit 15. The amplifier circuit 16 amplifies a signal relating to a temperature deference detected by the bridge circuit 15, and outputs the amplified signal to the outside as a flow signal (e.g., 0 to 5 VDC). The flow signal is output to the control circuit 17 as well.

The configuration of the control circuit 17 is described next.

Figure 3:
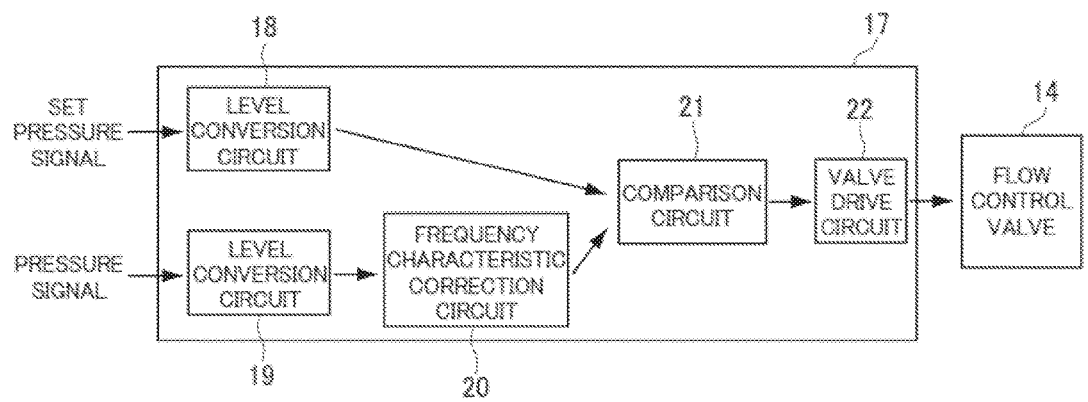
FIG. 3 shows a block diagram of a flow control valve device and a control circuit.

FIG. 3 shows a block diagram of the flow control valve device 14 and the control circuit 17.

As shown in FIG. 3, the control circuit 17 has two level conversion circuits 18, 19, a frequency characteristic correction circuit 20, a comparison circuit 21, and a valve drive circuit 22.

The level conversion circuits 18, 19 are the circuits for amplifying or attenuating a set pressure signal (e.g., 0 to 10 VDC) and a pressure signal (e.g., 0 to 10 VDC). The set pressure signal represents a set pressure value of the chamber 3 that is input from the outside. The pressure signal represents a pressure value detected by the pressure sensor 4, in order to have the comparison circuit 21 compare these signals accurately.

The frequency characteristic correction circuit is a filter circuit that uses an operational amplifier, and corrects the pressure signal detected by the pressure sensor 4 to raise a low-band frequency. The comparison circuit 21 compares the pressure signal after the frequency correction, with the set pressure signal, and then outputs a difference signal representing the difference therebetween to the valve drive circuit 22. Based on this difference signal, the valve drive circuit 22 controls the opening of the flow control valve device 14 so that the pressure within the chamber 3 becomes constant.

Next, operations performed at the start of the control of the pressure control system 10 are described with reference to FIG. 4. The operation for maintaining the pressure of the chamber 3 constant while reducing the pressure of the chamber 3 to (to make the pressure lower than the atmospheric pressure) is now described.

Figure 4:
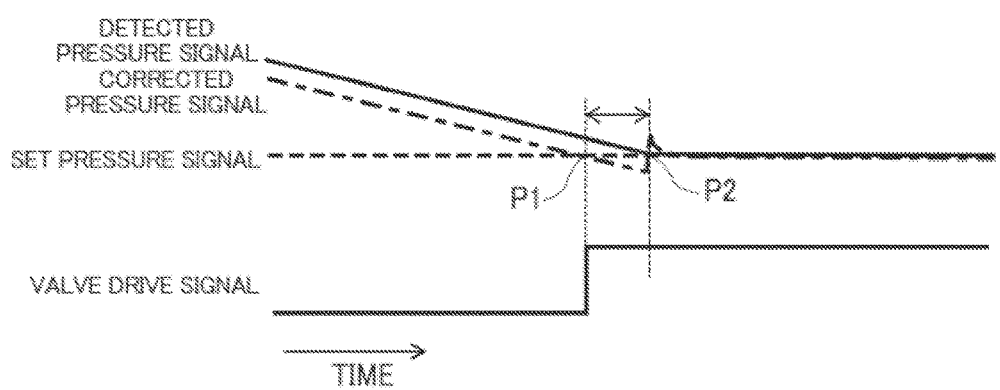
FIG. 4 is a diagram showing the behaviors of a detected pressure signal, a corrected pressure signal, a set pressure signal, and a valve drive signal, which are obtained at the start of control of the pressure control system.

FIG. 4 shows the behaviors of a detected pressure signal, a corrected pressure signal, a set pressure signal, and a valve drive signal, which are obtained at the start of the control of the pressure control system 10. The detected pressure signal detected by the pressure sensor 4 is indicated by a solid line. The corrected pressure signal after the correction is indicated by a chain line, the set pressure signal by a dotted line, and the valve drive signal by a solid line.

Figure 5:
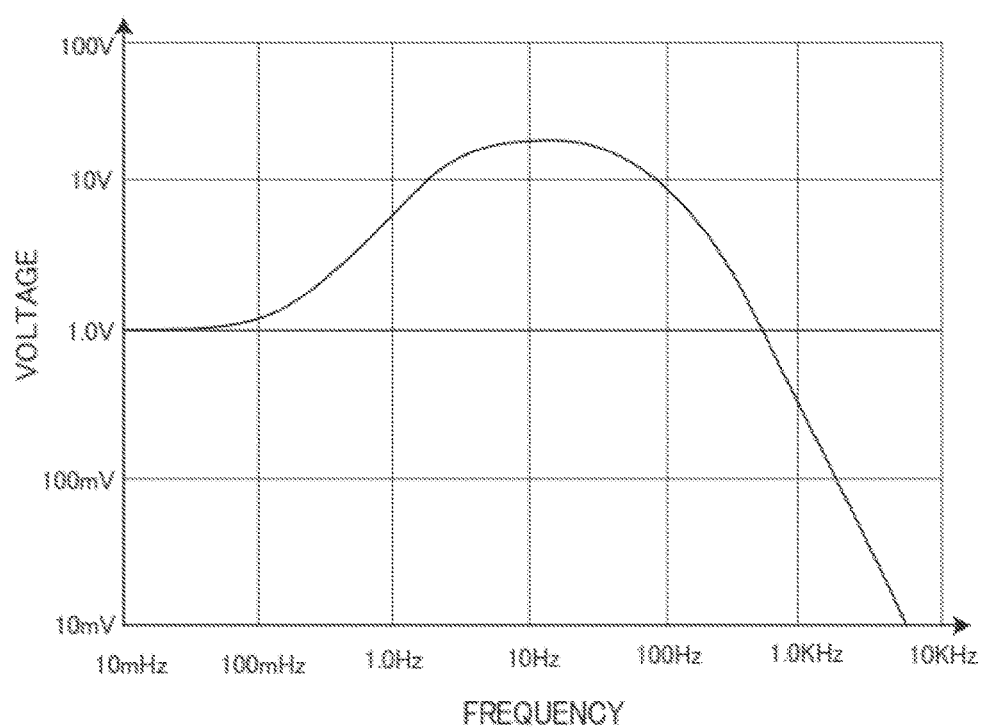
FIG. 5 is a diagram showing an example of a frequency characteristic curve.

The dry pump 6 is driven, with the opening of the variable valve device 5 being set at a prescribed opening, to draw the gas of the chamber 3 with a constant suction force. As a result, the detected pressure signal decreases at a constant rate, as shown in FIG. 4. Then, frequency characteristic correction is performed on this detected pressure signal by the frequency characteristic correction circuit 20. The frequency characteristic correction circuit 20 that has the frequency characteristics shown in FIG. 5 performs this correction when, for example, the volume of the chamber 3 is 1 m³, the length of the pipe 7 between the pressure control device 1 and the chamber 3 is 10 m, and the flow rate of the gas flowing through the pipe 7 is 300 sccm. In FIG. 5, the horizontal axis represents frequencies, and the vertical axis voltages.

The frequency characteristic curve shown in FIG. 5 has a peak at approximately 10 Hz corresponding to a prescribed frequency, wherein the voltage gradually increases from 1.0 V up to 10 Hz and decreases in a linear fashion when the frequency is greater than 10 Hz. The position of the peak (the prescribed frequency) of the frequency characteristic curve is determined based on the relationship between the flow rate of the gas flowing through the pipe 7 and the volume of the chamber 3 and/or based on the length of the pipe 7 between the pressure control device 1 and the chamber 3.

As shown in FIG. 4, the value of the corrected pressure signal is smaller than that of the detected pressure signal. In other words, the frequency characteristic correction circuit 20 corrects the detected pressure signal so as to raise a prescribed frequency component of the detected pressure signal, and as a result the detected pressure signal approaches the set pressure signal. Then, the comparison circuit 21 compares the corrected pressure signal with the set pressure signal, and when the corrected pressure signal is smaller than the set pressure signal (P1 in FIG. 4), the valve drive circuit 22 turns the valve drive signal on, opening the flow control valve device 14. As a result, the gas is supplied to the chamber 3.

After a prescribed period of time since supplying the gas to the chamber 3 (P2 in FIG. 4), the detected pressure signal becomes equal to the set pressure signal, changing the inclination of the detected pressure signal. This change causes the corrected pressure signal to drastically increase and then decrease shortly thereafter, and consequently the corrected pressure signal become approximately equivalent to the set pressure signal.

In this manner, the frequency characteristic correction circuit 20 has a peak at a prescribed frequency and corrects the detected pressure signal so as to raise the prescribed frequency component of the detected pressure signal. Accordingly, the time to open the flow control valve device 14 can be accelerated. Therefore, once the detected pressure and the set pressure become approximately equal to each other, the gas can be supplied to the chamber 3. Therefore, even if the volume of the chamber 3 with respect to the controlled flow of the gas is large, or even if the pipe 7 between the pressure control device 1 and the chamber 3 is long, the pressure within the chamber 3 can be maintained constant without fluctuating.

Furthermore, because the prescribed frequency is determined based on the relationship between the flow rate of the gas flowing through the pipe 7 and the volume of the chamber 3 and/or based on the length of the pipe between the chamber 3 and the pressure control device 1, the detected pressure signal can be corrected appropriately.

In addition, when the detected pressure signal has a value greater than that of the set pressure signal and changes in a decreasing manner, the frequency characteristic correction circuit 20 corrects the detected pressure signal so that the value thereof becomes small. By performing such correction in order to maintain the pressure within the chamber 3 constant by reducing the pressure within the chamber 3, the pressure within the chamber 3 can be maintained constant without fluctuating.

Note that the present invention is not limited to the foregoing example. Those skilled in the art can make various additions, changes, and the like within the scope of the present invention.

Figure 6:
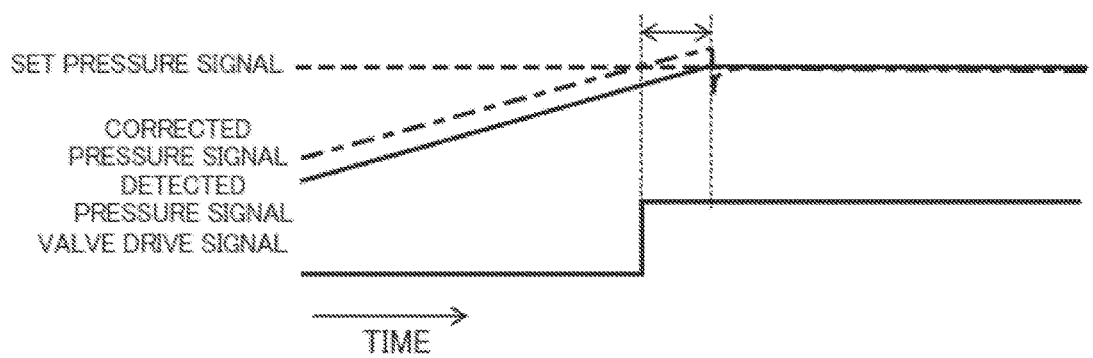
FIG. 6 is a diagram showing the behaviors of a detected pressure signal, a corrected pressure signal, a set pressure signal, and a valve drive signal, which are obtained at the start of control of a pressure control system according to a modification.

The foregoing embodiment has described the case where the pressure control device 1 reduces the pressure within the chamber 3 to maintain the pressure constant; however, the pressure control device 1 may increase the pressure within the chamber 3 to maintain the pressure constant. In other words, as shown in FIG. 6, when the detected pressure signal has a value smaller than that of the set pressure signal and changes in an increasing manner, the frequency characteristic correction circuit 20 corrects the detected pressure signal in such a manner that the value thereof increases. By performing such correction, the pressure within the chamber 3 can be maintained constant without fluctuating.

The circuits provided in the pressure control device 1 may be analog circuits or digital circuits. The target of pressure control described in the foregoing embodiment is the chamber 3 but may also be a pressure container and the like.

What is claimed is:

1. A pressure control device which maintains a pressure within a target of pressure control at a set pressure, the pressure control device comprising:
   a correction circuit that corrects a pressure signal, which represents the pressure within the target of pressure control that is detected by a pressure sensor, such that the pressure signal approaches a set pressure signal representing the set pressure;

a comparison circuit that compares the corrected pressure signal with the set pressure signal; and a valve drive circuit that controls an opening and closing of a flow control valve based on a comparison result from the comparison circuit, wherein the correction circuit is a filter circuit, the frequency characteristic of the filter circuit having a peak at a prescribed frequency, and correcting the pressure signal so as to raise a component of the prescribed frequency of the pressure signal, wherein the prescribed frequency is determined based on a relationship between the flow rate of a gas flowing through a pipe and a volume of the target of the pressure control and/or based on a length of the pipe between the target of the pressure control and the pressure control device.

2. The pressure control device according to claim 1, wherein when the pressure signal has a value greater than that of the set pressure signal and changes in a decreasing manner, the correction circuit corrects the pressure signal in such a manner that the value thereof becomes small.

3. The pressure control device according to claim 1, wherein when the pressure signal has a value smaller than that of the set pressure signal and changes in an increasing manner, the correction circuit corrects the pressure signal in such a manner that the value thereof becomes large.

\* \* \* \* \*